Figures 1, 2:
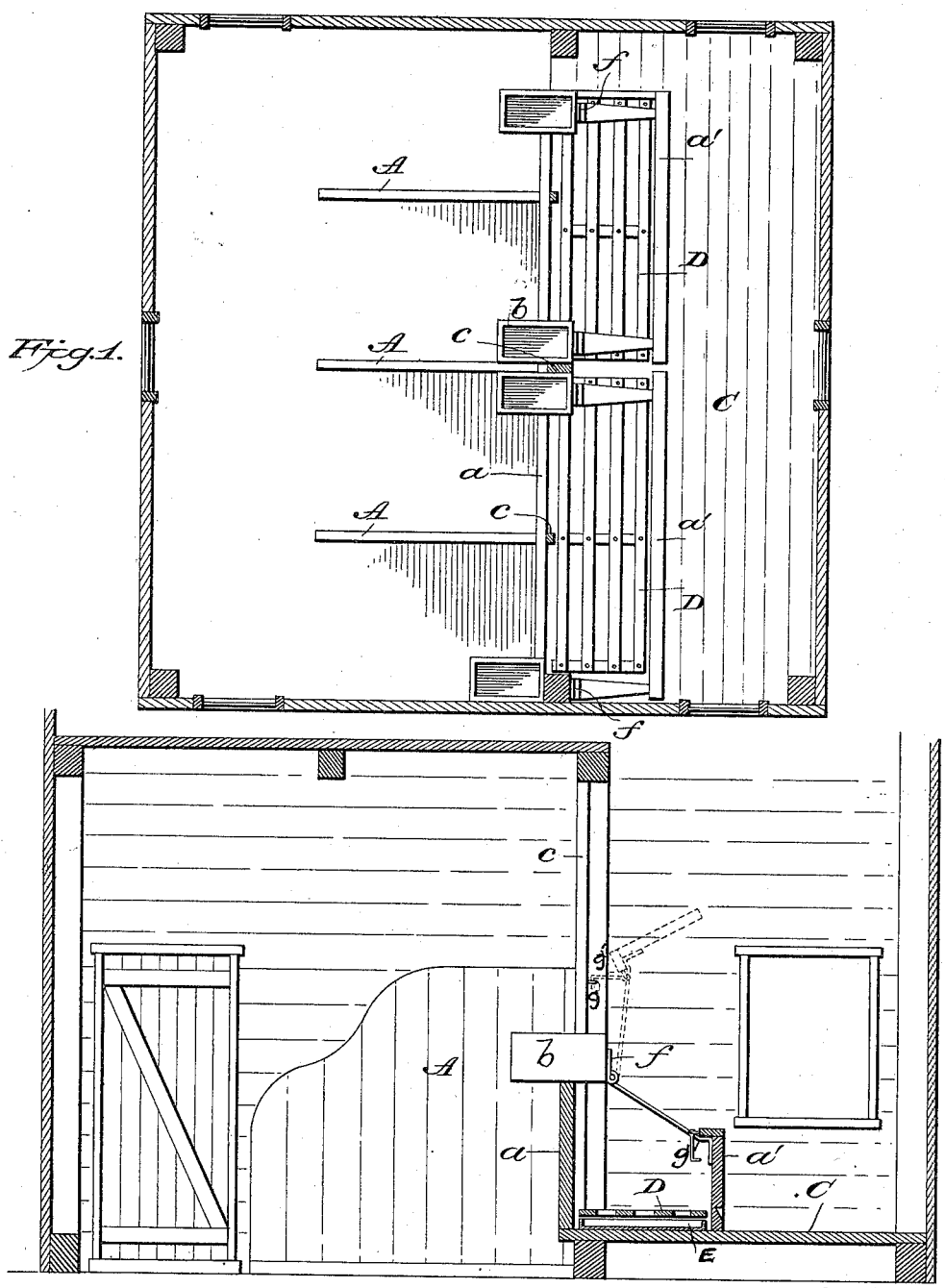

No. 656,653. Patented Aug. 28, 1900.
I. MORRIS.
MANGER FOR FEEDING LIVE STOCK.
(Application filed July 14, 1900.)
(No Model.)

Witnesses
G. S. Elliott.
H. H. Johnson.

Inventor
Isaiah Morris
by Eugene H. Johnson
his Attorney

UNITED STATES PATENT OFFICE.

ISAIAH MORRIS, OF MEMPHIS, OHIO.

MANGER FOR FEEDING LIVE STOCK.

SPECIFICATION forming part of Letters Patent No. 656,653, dated August 28, 1900.

Application filed July 14, 1900. Serial No. 23,614. (No model.)

*To all whom it may concern:*

Be it known that I, ISAIAH MORRIS, a citizen of the United States, residing at Memphis, in the county of Clinton and State of Ohio, have invented new and useful Improvements in Mangers for Feeding Live Stock, of which the following is a specification.

This invention relates to improvements in mangers, the object being to provide a manger of a construction which will admit of the same being readily cleansed and which will permit seeds or other finer particles of the feed being saved; and with the above end in view my invention consists in the construction and arrangement of the parts, as will be hereinafter set forth, whereby the floor of the stable forms the bottom of the manger, one of the walls of the manger being attached so as to swing upward, leaving that side which is farthest from the stall entirely open, so that the manger may be cleansed by raking or sweeping what debris may collect therein when the floor is cleansed.

In the accompanying drawings, Figure 1 is a horizontal sectional view taken through a portion of a stable or barn at a level above the stall looking downward, and Fig. 2 is a vertical section.

The barn or stable is of the ordinary construction, being built up so as to provide earth floors for the stalls, the stalls being formed by partitions A, and above said stalls is the floor of the loft, in which hay or fodder can be stored. The floor of the loft may terminate above a vertical partition or board $a$, which is of sufficient height to form one of the walls of the manger. Each manger is supplied with a feed-box $b$, which rests upon the upper edge of the board $a$, adjacent to the uprights or stanchions $c$, to which the partitions forming the stalls may be attached. The barn or structure has a floor C, which is positioned at a considerable height above the floors of the stalls, and in practice upon this floor C is placed an open-work grating D, made up of longitudinal slats attached to cross-pieces, which cross-pieces maintain the gratings above the level of the floor C, and thereby reduce the depth of the mangers. The gratings are made in several sections in order that they may be conveniently handled, and beneath the same are placed pans or seedboxes E, which are intended to receive grain or seeds which may fall from the hay in order that the same may be saved.

The wall $a'$ of the manger may consist of a series of sections or boards which are attached to means for maintaining the same in a vertical position when resting upon the floor, and the means preferably consists of hinges made so as to present on one side of the pintles short leaves $f$ and on the other side leaves which extend from the pintles to the boards $a'$, or if short leaves are used they are connected to bars of sufficient length to extend across the gratings, the ends of the bars being bent for attachment to battens or to the boards $a'$. When the long leaves of the hinges are made of a single piece, they are bent at their ends at an obtuse angle. In practice I prefer to use a single board or section $a'$ for two stalls and to the center stanchion secure an eye $g$, with which engages a hook $g'$, attached to the section $a'$, as shown, for maintaining the same in an elevated position. The weight of the sections is sufficient to hold them properly in place when lowered, though, if desirable, the hooks may be caused to engage with staples or eyes secured to the floor. Cleats may also be attached to the wall or sections $a'$ for use in raising the same.

The manger herein described may be cheaply constructed, and on the score of cleanliness is a great improvement over mangers as usually constructed.

When the wall $a'$ rests upon the floor, it is maintained in a vertical position and does not interfere with the way or walk which it is common to provide in front of the stalls, and when in such position the mangers can be filled from above.

Should the bedding be stored in the loft and the partition or section $a'$ be secured in an inclined position by causing the retaining device to engage with the eye or staple carried by one of the stanchions, such bedding when projected beyond the floor of the loft will fall upon the inclined board $a'$, and thus be guided into the stalls.

The invention may be modified as to the details of construction without departing from the spirit of my invention.

I claim—

1. In a structure having a plurality of stalls, the floors thereof being below the level of an adjacent floor, a fixed board constituting one side of a manger, and a board hinged to assume a position parallel with the fixed board when lowered to form the opposite side of the manger and to assume an upwardly-inclined position when raised, substantially as shown and for the purpose set forth.

2. A manger comprising a fixed board which forms one side of the same and separates the same from the stall, a board supported by hinges to have its downward movement limited by engagement with a floor which floor forms the bottom of the manger, substantially as shown.

In testimony whereof I have hereunto set my hand in presence of two subscribing witnesses.

ISAIAH MORRIS.

Witnesses:
  FRANKLIN BABB,
  W. T. MATTHEWS.